US005784697A

United States Patent [19]

Funk et al.

[11] Patent Number: 5,784,697
[45] Date of Patent: Jul. 21, 1998

[54] PROCESS ASSIGNMENT BY NODAL AFFINITY IN A MYULTIPROCESSOR SYSTEM HAVING NON-UNIFORM MEMORY ACCESS STORAGE ARCHITECTURE

[75] Inventors: Mark Robert Funk; Larry Keith McMains; Donald Arthur Morrison, all of Rochester; Robert Anthony Petrillo, Fountain; Robert Carl Seemann, Rochester; Arthur Douglas Smet, Rochester; Timothy Joseph Torzewski, Rochester, all of Minn.

[73] Assignee: International Business Machines Corporation, Armonk, N.Y.

[21] Appl. No.: 622,230

[22] Filed: Mar. 27, 1996

[51] Int. Cl.⁶ .............................. G06F 12/02; G06F 9/44
[52] U.S. Cl. ............................. 711/170; 711/148; 395/675
[58] Field of Search ............................ 395/672, 674, 395/474, 475, 670, 675, 676; 711/147, 148, 170

[56] References Cited

U.S. PATENT DOCUMENTS

| | | | |
|---|---|---|---|
| 4,914,570 | 4/1990 | Peacock | 395/676 |
| 4,980,822 | 12/1990 | Brantley, Jr. et al. | 711/202 |
| 5,093,913 | 3/1992 | Bishop et al. | 711/152 |
| 5,210,844 | 5/1993 | Shimura et al. | 711/153 |
| 5,228,127 | 7/1993 | Ikeda et al. | 395/200.55 |
| 5,237,673 | 8/1993 | Orbits et al. | 711/170 |
| 5,269,013 | 12/1993 | Abramson et al. | 711/170 |
| 5,325,526 | 6/1994 | Cameron et al. | 395/672 |
| 5,349,664 | 9/1994 | Ikeda et al. | 395/652 |
| 5,404,521 | 4/1995 | Murray | 395/674 |
| 5,592,671 | 1/1997 | Hirayama | 395/674 |

OTHER PUBLICATIONS

Chase et al., "The Amber System: Parallel Programming on a Network of Multiprocessors," Proceedings of the 12th ACM Symposium on Operating Systems Principles, Dec. 1989, pp. 147-158.

Primary Examiner—Eddie P. Chan
Assistant Examiner—Kevin L. Ellis
Attorney, Agent, or Firm—Felsman, Bradley, Gunter & Dillon

[57] ABSTRACT

According to the present invention, pool allocation and process assignment mechanisms create process nodal affinity in a NUMA multiprocessor system for enhanced performance. The multiprocessor system includes multiple interconnected multiprocessing nodes that each contain one or more processors and a local main memory, the system main storage being distributed among the local main memories of the multiprocessing nodes in a NUMA architecture. A pool reservation mechanism reserves pools of memory space within the logical main storage, and the pool allocation mechanism allocates those pools to real pages in the local main-memory of multiprocessing nodes. Processes to be created on the multiprocessor are given an attribute that indicates an associated pool. Upon creation, the process assignment mechanism will only assign a process to a multiprocessing node that has been allocated the pool indicated by the process' attribute. This process nodal affinity increases accesses by the assigned process to local main storage of that node, thereby enhancing system performance.

22 Claims, 4 Drawing Sheets

PROCESS ASSIGNMENT BY NODAL AFFINITY IN A MYULTIPROCESSOR SYSTEM HAVING NON-UNIFORM MEMORY ACCESS STORAGE ARCHITECTURE

BACKGROUND OF THE INVENTION

1. Technical Field

The present invention relates in general to an improved non-uniform memory access storage architecture multiprocessor system, and in particular to an improved memory distribution mechanism having pool allocation and process assignment mechanisms in a non-uniform memory access storage architecture multiprocessor system.

2. Description of the Related Art

The ever increasing demand for computing power has driven computer architectures toward multiprocessor or parallel processor designs. While uniprocessors are limited by component and signal speed to processing only a few instructions simultaneously, a multiprocessor contains multiple independent processors, which can execute multiple instructions in parallel, substantially increasing processing speed. A group of processors within the multiprocessor can be defined as a node or cluster where each processor of the node executes instructions of one or a few processes to enable efficient, parallel processing of those processes. Some advanced multiprocessors contain multiple nodes and assign processes to different nodes in the system to provide parallel processing of multiple processes.

In a tightly-coupled multiprocessor system, the system's multiple processors are interconnected by a high-speed, circuit-switched interconnection network, and usually share a single memory system. The processors are typically controlled by the same control program and can communicate directly with each other. A user can use such a system as a single-processor system, but if a user program spawns several tasks, the operating system may assign them to different processors. For processes that do not generate subprocesses, a multiprogramming operating system can regard the processors of a multiprocessor as a simple set of computational resources, where several programs are started on an available processor.

An emerging memory architecture in tightly-coupled multiprocessor systems is the non-uniform memory access (NUMA) storage architecture. NUMA storage architecture provides overall speed advantages not seen in the prior art. Also, the architecture combines massive scalability of up to 250 processors with the simplified programming model of symmetric mulitprocessor technology. The NUMA multiprocessor system is a set of symmetric multiprocessor (SMP) nodes interconnected with a high-bandwidth interconnection that allows all processors to access any of the main storage in the system. The nodes share the same addressable main storage, which is distributed among the local main memories of the nodes. The access time to the local main storage within a node is the same for all processors in the node. Access to main storage on another node, however, has a much greater access latency than a similar access to local main storage. Given this greater latency of accesses to non-local storage, system performance could be enhanced if the operating system's memory management facility was capable of managing the use of storage such that the percentage of processor memory accesses to non-local storage is minimized. Thus, without developing such a capability, the multiprocessing industry will not be able to benefit from the superior performance of NUMA storage architecture to the extent possible.

SUMMARY OF THE INVENTION

According to the present invention, pool allocation and process assignment mechanisms create process nodal affinity in a NUMA multiprocessor system for enhanced performance. The multiprocessor system includes multiple interconnected multiprocessing nodes that each contain one or more processors and a local main memory, the system main storage being distributed among the local main memories of the multiprocessing nodes in a NUMA architecture. A pool reservation mechanism reserves pools of memory space within the logical main storage, and the pool allocation mechanism allocates those pools to real pages in the local main-memory of multiprocessing nodes. Processes to be created on the multiprocessor are given an attribute that indicates an associated pool. Upon creation, the process assignment mechanism will only assign a process to a multiprocessing node that has been allocated the pool indicated by the process' attribute. This process nodal affinity increases accesses by the assigned process to local main storage of that node, thereby enhancing system performance.

BRIEF DESCRIPTION OF THE DRAWINGS

The novel features believed characteristic of the invention are set forth in the appended claims. However, the invention, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
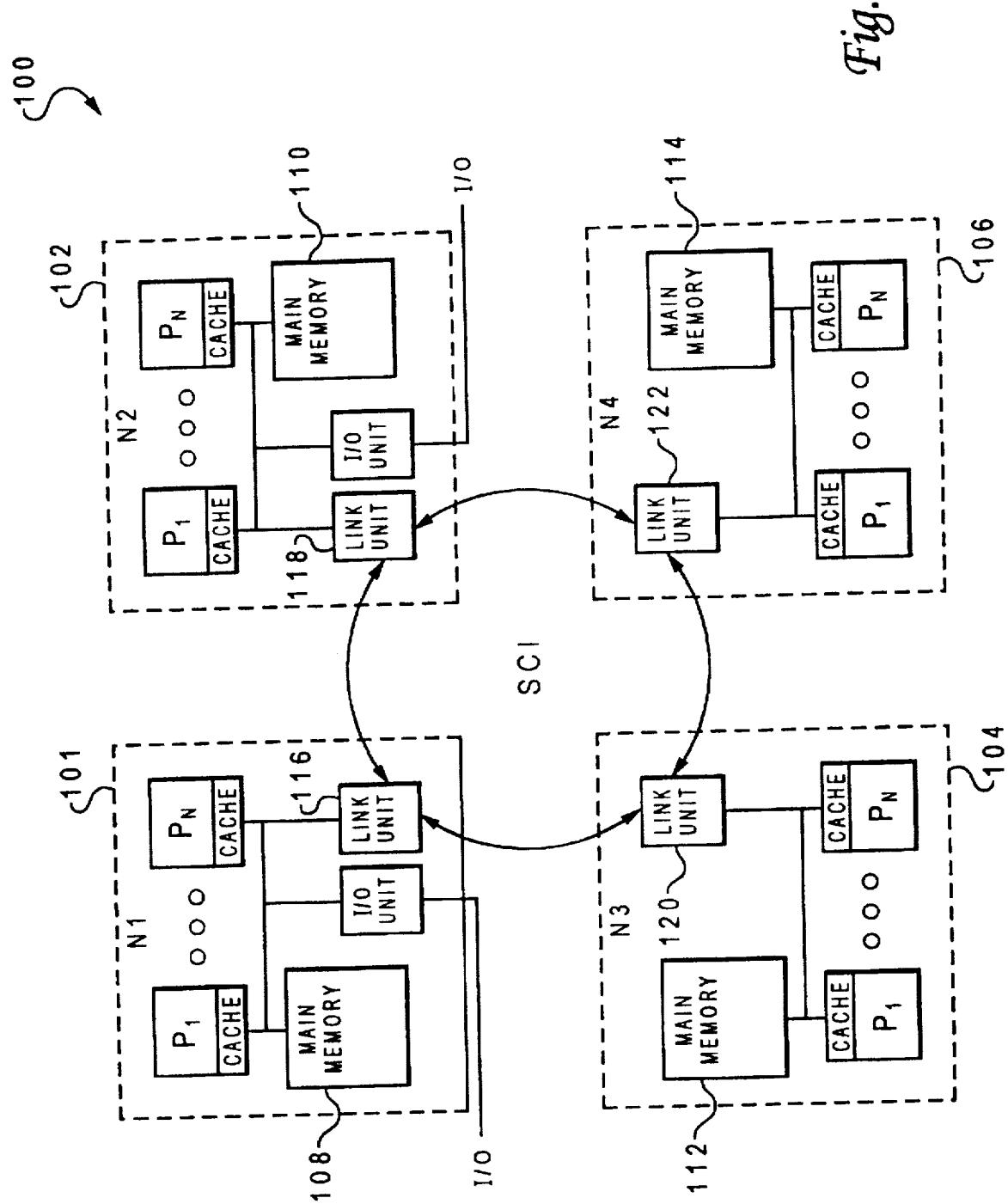
FIG. 1 depicts a block diagram of a shared-memory multiprocessor system having NUMA storage architecture which may be utilized in accordance with the present invention.

FIG. 1 depicts a block diagram of a shared-memory multiprocessor system having Non-Uniform Memory Access (NUMA) storage architecture, also known as Shared Memory Cluster (SMC) storage architecture, which may be utilized in accordance with the present invention. The shared-memory NUMA multiprocessor system, shown generally at 100, is a set of symmetric multiprocessor (SMP) nodes, each with their own set of processors, main storage, and potentially I/O-connection, interconnected with a high-bandwidth interconnection that allows all processors to access the contents of all of the main storage in the system. More precisely, it can be characterized by the following attributes:

1) An interconnection of a set of SMP nodes with each SMP node containing:

A) 1 to N processors;

B) Main Storage cards;

C) Cache, connected individually to each processor and/ or to subsets of the node's processors;

D) Potentially 1 or more connections to I/O busses and devices.

2) The contents of every node's main storage is accessible by all processors.

3) The contents of main storage in processor caches (or caches of processor subsets) is capable of remaining coherent with all changes made to the contents of any main storage. Storage Ordering and Atomicity can also be maintained.

4) The term "local" is defined to mean those processors and main storage which are on the same node and the term "nonlocal" or "remote" as main storage and processors which are on different nodes. The access time (cache fill latency for instance) for a processor to read or write the contents of main storage which is local tends to be faster than the access time to nonlocal main storage.

5) I/O and interprocessor interrupts are presentable to any (or a subset of any) node or processor.

As shown in the embodiment of FIG. 1, the system comprises four multiprocessing nodes 101, 102, 104, 106. In general, each multiprocessing node has one or more processors connected to a local main memory within the node through an intra-node connection mechanism, such as a special crossbar bus or switch. As shown in FIG. 1, each multiprocessing node 101-106 contains a plurality of processors $P_1$-$P_N$ and their associated cache memory, and a main memory (main memory 108-114, respectively) that is local to the node's processors. Multiprocessing nodes 101, 102 also contain an I/O Unit for supporting connection to I/O space, including printers, communication links, workstations, or direct access storage devices (DASD).

The multiprocessor nodes are interconnected by a Scalable Coherent Interconnect (SCI) that conforms with the IEEE 1596-1992 standard. SCI is a high-bandwidth interconnection network implemented by a pumped bus (18-bit wide) that sends packets at a rate of 16 data bits per 2 nsec (1 GByte/sec peak) on each individual point-to-point interconnect, and that provides for cache coherence throughout the system. Each multiprocessing node's link unit of link units 116-122 provides the connection to the SCI, enabling the interconnection of multiprocessing nodes.

All processors throughout the system share the same addressable main storage, which is distributed among the multiprocessing nodes in the local main memories, and is accessible by all processors. Thus, the total addressable main storage within system 100 consists of the combination of the main storage within all the local main memories 108-114. Each byte of system main storage is addressable with a unique real address. The bus logic for each multiprocessing node monitors memory accesses by the node's processors or I/O unit and directs local memory accesses to the node's local main memory. Remote accesses to non-local memory are sent to the interconnect network via the link unit.

Figure 2:
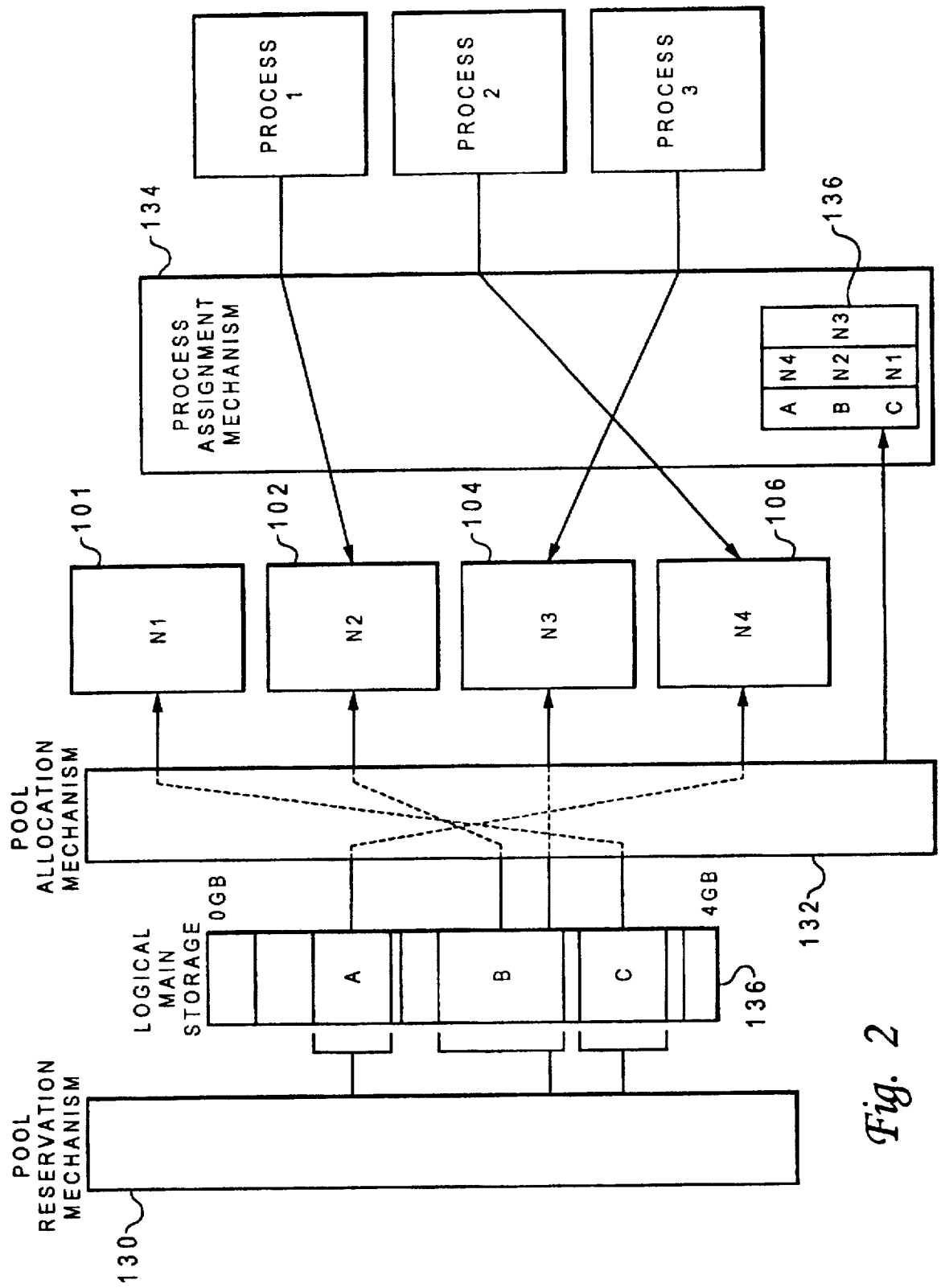
FIG. 2 illustrates a logical block diagram of the memory management and process assignment mechanisms of the multiprocessor data processing system of FIG. 1, in accordance with an illustrative embodiment of the present invention.

Referring now to FIG. 2, there is illustrated a logical block diagram of the pool reservation, pool allocation and process assignment mechanisms of the multiprocessor system of FIG. 1, in accordance with an illustrative embodiment of the present invention. The operating system for the multiprocessor system includes a pool reservation mechanism 130, a pool allocation mechanism 132, and a process assignment mechanism 134. As has been explained above, the system's main storage is distributed among the multiprocessing nodes 101-106 (shown in FIG. 2 as N1, N2, N3, and N4, respectively) in a NUMA storage architecture such that the main storage is contained within the local main memories 108-114 of the plurality of interconnected multiprocessing nodes. The total storage capacity for the system that is contained in the local main memories is shown as logical main storage 136. Logical main storage 136 is a logical representation of the total real memory pages available in all local main memories 108-114. In this example, the logical main storage is shown to have a capacity of 4 GB, or approximately one million 4 KB pages.

According to the present invention, pool reservation mechanism 130, which is part of the operating system's memory management system, reserves one or more pools of a predetermined or precalculated number of real memory pages within logical main storage 136. As is known in the art, a pool is the reservation of a portion or a percentage of main storage by a user (or the operating system) for a user-defined purpose. Pool reservation mechanism 130 supports multiple pools, which can each vary in size from zero pages to most of the main storage. In the example of FIG. 2, pool reservation mechanism 130 reserves pools A, B, and C to their preassigned or precalculated sizes.

Pool allocation mechanism 132 preferentially allocates pools of memory space among the multiprocessing nodes 101-106 in their local main memories 108-114. Pool allocation mechanism 132 allocates a particular reserved pool to one or more multiprocessing nodes of the plurality of interconnected multiprocessing nodes based on preselected criteria or an assignment algorithm that takes into account a variety of factors, such as processor utilization, for example. The local main-memory of one of a plurality of multiprocessing nodes allocated a particular pool may contain the entire pool, a portion of the pool, or none of the pool pages at any given time. The function of allocation designates the pages of a pool, as reserved in logical main storage 136, as representing particular real pages in one or more particular nodes. This allocation is performed within a pool directory, as described below. In the example shown in FIG. 2, pool allocation mechanism 132 allocates pool A to multiprocessing node 106 (N4) and pool B to multiprocessing nodes 102 (N2) and 104 (N3). Since pool A has been allocated to only one multiprocessing node, the pages for the entire pool reside in local main memory 114. The pages of memory for pool B are distributed between local main memories 110 and 112, each local main memory receiving from no page of memory to every page of memory of the pool. As will be appreciated, allocating a pool to a multiprocessing node does not necessarily include storing particular data within the local main memory of that node.

Figure 3:
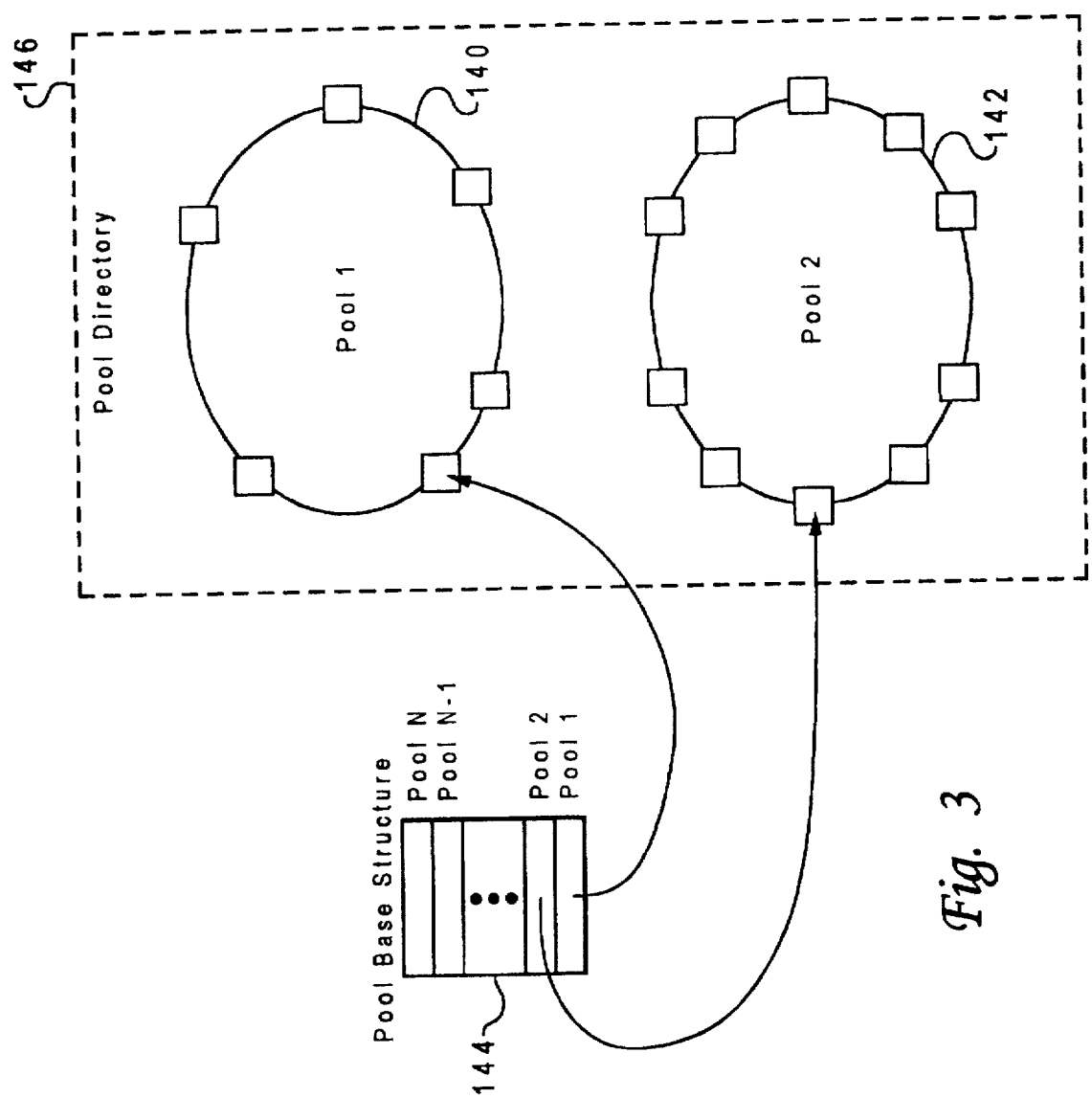
FIG. 3 shows a diagram of pool allocation within a pool directory for a node as performed by a pool allocation mechanism, in accordance with a preferred embodiment of the present invention.

Referring to FIG. 3, there is shown a diagram of pool allocation within a pool directory for a node as performed by pool allocation mechanism 132, in accordance with a preferred embodiment of the present invention. In the multiprocessor, a pool directory is maintained for every node that contains directory entries mapping a pool identifier to each page of memory on the node. As will be appreciated, each of the pool directory entries has a one-to-one relationship with a real page of memory on the node. In the example of FIG. 3, the pool directory 146 comprises a set of directory entries for Pool 1 connected in a circular linked list 140, and a set of directory entries for Pool 2 connected in a circular linked list 142.

Pool allocation mechanism 132 allocates a reserved pool to a node by creating an entry for the pool in pool base structure 144 and creating a linked list of entries for the pool in pool directory 146. As seen in FIG. 3, pool base structure entries for Pool 1-Pool N have been created. Each pool base structure entry includes information on the size of the pool, the address of the first pool directory entry in that pool, and rolling statistics on the utilization of the pool, such as information on the rate of changed pages, the rate of unmodified page invalidation, and the rate of specific types of pages (i.e. database, I/O, etc.), for example. The address of the first pool directory entry in that pool is used to index into the pool directory entries, and then the pool is defined by the circular linked list (which potentially can contain millions of pages). The circular linked list is updated as entries (and their corresponding pages) are moved in and out of the pool. A pool may be allocated to a node by creating an entry in pool base structure 144, while not holding and pool directory entries and, therefore, not containing any pages of real memory on that node (see Pool N, for example).

Referring back to FIG. 2, process 1, 2, and 3 are processes that have been created or spawned for execution on the multiprocessor system. Each process 1-3 has an attribute set by the system user indicating a memory pool to be associated with the process. Process assignment mechanism 134 preferentially assigns each of these processes to a multiprocessing node to be executed as a function of the process' pool attribute. If only one node has been allocated the pool indicated by the pool attribute, the process will be assigned to that node. If multiple nodes have been allocated the pool, the process assignment mechanism 134 uses utilization statistics (i.e., paging rates and memory availability for the pool) to determine to which of the multiple nodes the process will be assigned. A node with a lesser paging rate, which typically will be the node with the most available pages in the pool, will tend to be chosen by process assignment mechanism 134 under this criteria.

When allocating a pool to a multiprocessing node, pool allocation mechanism 132 reports the allocation to process assignment mechanism 134 in a preferred embodiment. Process assignment mechanism 134 maintains an allocation record 136 of the nodes allocated reserved pools that is accessed to find a match between the associated pool for the process and a memory pool in the allocation record. If a match is found, the process is assigned to the multiprocessing node or one of a plurality of multiprocessing nodes listed for that pool in allocation record 136. Since the pool associated with the process has been allocated to that node, it is likely that the memory addresses accessed by the process will be contained in the local main memory of that multiprocessing node. Further, processes created on a node tend to stay resident within that node (i.e., are dispatched to the processors of that node) such that storage will tend to only be allocated locally. The pool allocation mechanism will continue to keep rolling performance statistics concerning the utilization (i.e., paging rates and availability) of the main storage associated with each pool on each node and will re-allocate pools as necessary. It should be appreciated that after processes are assigned to a node, the processes can be moved amongst the multiprocessing nodes. The decision of whether to move, and the target node of the move would also be based on memory pool availability and utilization. In the example shown in FIG. 2, Process 1 and Process 3 are associated with pool B and Process 2 is associated with pool A. Allocation record 136 shows pool A has been allocated to N4 (multiprocessing node 106), pool B has been allocated to N2 and N3 (multiprocessing nodes 101 and 102), and pool C has been allocated to N1. Therefore, process assignment mechanism 134 has assigned Process 1 to N2, Process 2 to N4, and Process 3 to N3. In an alternative embodiment, an allocation record would not be kept and the process assignment mechanism would interrogate the pool base structure of each node to determine the allocation of pools.

If a process (with its task(s)/thread(s)) accesses a page in virtual address space that has not yet been mapped onto real address space, the page is acquired for the process by pool allocation mechanism 132 which will map the accessed page in virtual address space onto a physical page on the node within the pool associated with the process. As a further limitation for enhanced performance, it can be required that a page mapped for a process may be mapped into the process' associated pool only on the process' assigned node. In other words, once assigned, a process executing on a particular node's processor will only be allocated the storage from the pool space of that node. The pool indicated by the pool attribute of the process is located in pool base structure 144, and the linked list in pool directory 146 that is indexed by the pool base structure entry is searched for an available page in the pool. When an available page is found or created, the entry for the page in the pool directory 146 is mapped to the virtual address causing the page fault. If the user or system has skillfully associated similar processes with the same pool, entries in a particular node's pool directory will likely contain pages required by more than one process associated with that pool, creating less page faults and/or non-local memory accesses. Consequently, both the processes and the pools of memory those processes access will tend to remain on the node, thereby increasing accesses to local main storage throughout the multiprocessor system.

As can be seen, the present invention creates a "nodal affinity" for processes and the memory they access. In other words, processes are assigned to nodes having an allocated memory pool that is likely to contain the data required by the process. Moreover, the data for a given memory pool is likely to remain on the allocated nodes because processes requiring access to that data will be assigned to only those nodes. Further, if the pool allocation mechanism allocates individual storage pools in as few nodes as possible, process nodal affinity will reduce memory access times by reducing the number of non-local storage accesses across nodal boundaries. This increased locality of reference provided by the present invention substantially increases performance of the NUMA storage architecture.

Figure 4:
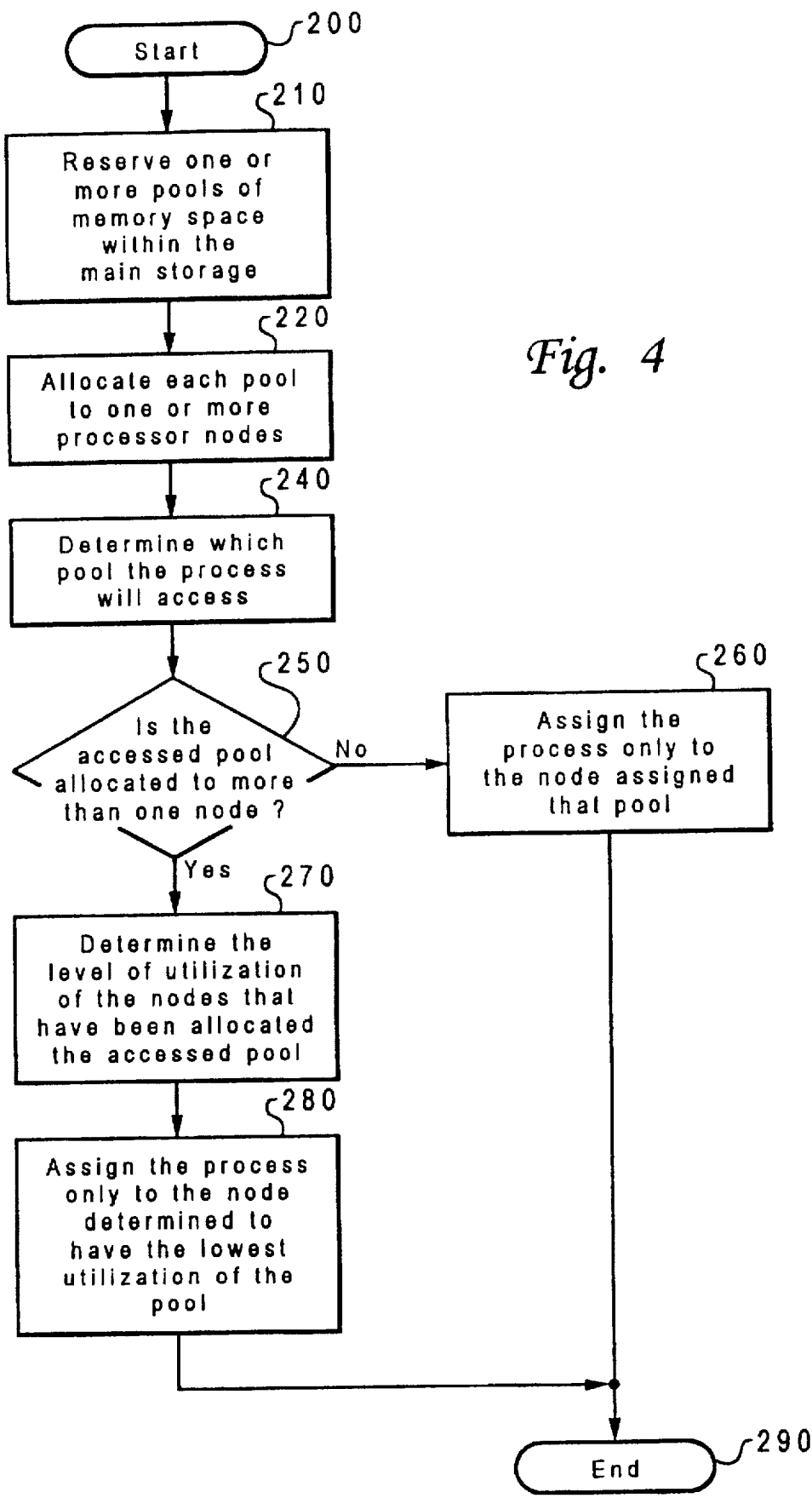
FIG. 4 depicts a logic flow diagram of a method of process assignment in a multiprocessor system having NUMA storage architecture, in accordance with an illustrative embodiment of the present invention.

Referring now to FIG. 4, there is depicted a logic flow diagram of a method of process assignment in a multiprocessor system having NUMA storage architecture, in accordance with an illustrative embodiment of the present invention. The process starts at step 200 and proceeds to step 210 where one or more pools of memory space within the main storage are reserved. This reserved portion of addressable memory is reserved for a particular user-defined purpose. The operating system dynamically reserves pools of memory that vary in size from zero pages to blocks of memory containing millions of pages. The method then proceeds to step 220 where a reserved pool of memory is allocated to one or more multiprocessing nodes in the system. The operating system (or the System Operator) will determine pool size and allocate the pool of memory to a particular node based on current and likely system utilization, as well as generic advice by the system user. These determinations and allocations are dynamically adjusted by the system as performance statistics are acquired. Also, the operating system may allocate or re-allocate a pool to more than one multiprocessing node depending on system information.

The method proceeds to step 240 where it is determined which pool of memory the process will access during its execution, as indicated by the pool attribute specified by the System Operator. The method proceeds to decision block 250 where a decision is made whether or not more than one multiprocessing node has been allocated the pool of memory indicated by the pool attribute. If the pool of memory has only been allocated to one multiprocessing node, the process must be assigned to the node allocated that pool, as depicted at step 260. If at decision block 250 it is determined that the pool has been allocated to more than one multiprocessing node, the method proceeds to step 270, where the level of utilization for the pool of memory is determined at each multiprocessing node allocated that pool. The utilization of the pool of memory on each node can be determined by tracking the paging rates and availability of the main storage associated with the pool. The multiprocessing node with the lowest utilization is determined as having the lowest paging rates and the highest local main memory availability of the pool of memory. The method then proceeds to step 280 where the process is assigned to the node determined to have the lowest utilization of the pool of memory to be associated with the process. The process may be assigned to a different node, but enhanced performance is best achieved if the process is assigned to a multiprocessing node that has been allocated the associated pool of memory. Thereafter, the method ends at step 290.

Although, in a preferred embodiment, the pool reservation, pool allocation, and process assignment mechanisms have been described as operating system software objects, it will be appreciated by those skilled in the art that such mechanisms may be implemented in hardware, software, or a combination thereof. Also, it is important to note that while the present invention has been described in the context of a fully functional computer system, that those skilled in the art will appreciate the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disks and CD ROMS and transmission type media such as digital and analogue communications links.

In summary, the present invention provides an improved shared-memory multiprocessor system having NUMA storage architecture that assigns a process to a node that is allocated an associated pool, and, thereafter, allows the process to only acquire memory from that pool. This results in a maximization of accesses to main storage local to each processor supporting a given process, thereby substantially enhancing performance of the multiprocessor system of the present invention. As will be appreciated, the present invention allows the system user, or the system user with operating system assistance, to more efficiently manage work at a selected set of processors where the memory space for that set is located, thereby maximizing accesses to the local main storage and increasing memory performance. While the invention has been particularly shown and described with reference to a preferred embodiment, it will be understood by those skilled in the art that various changes in form and detail may be made therein without departing from the spirit and scope of the invention.

What is claimed is:

1. A method of process assignment in a multiprocessor system having non-uniform memory access storage architecture, the multiprocessor system having multiple interconnected multiprocessing nodes and a main storage distributed among the multiprocessing nodes, wherein each multiprocessing node contains one or more processors and a local main memory, the method comprising the steps of:

dynamically reserving a pool of memory space within the main storage during operation of said multiprocessor system;

allocating the reserved pool of memory space to one or more multiprocessing nodes among the multiple multiprocessing nodes; and following allocation of said reserved pool of memory space to said one or more multiprocessing nodes, assigning a process associated with the pool of memory space to a multiprocessing node allocated that pool of memory space such that accesses to local main memory are increased and system performance is enhanced.

2. A method of process assignment in a multiprocessor system having non-uniform memory access storage architecture according to claim 1, wherein processes are given an attribute indicating the pool associated with the process.

3. A method of process assignment in a multiprocessor system having non-uniform memory access storage architecture according to claim 1, wherein a portion of memory is acquired by a process from the associated pool within the process' assigned node.

4. A method of process assignment in a multiprocessor system having non-uniform memory access storage architecture according to claim 1, further comprising allocating the pool of memory space to two or more multiprocessing nodes of the plurality of multiprocessing nodes such that the pool of memory space comprises memory space within the local main memory of the two or more multiprocessing nodes.

5. A method of process assignment in a multiprocessor system having non-uniform memory access storage architecture according to claim 4, wherein the process is assigned to a particular multiprocessing node among the two or more multiprocessing nodes as a function of utilization of said pool of memory space by each multiprocessing node.

6. A multiprocessor system of non-uniform memory access storage architecture, the multiprocessor system comprising:

a plurality of interconnected multiprocessing nodes, wherein each multiprocessing node among the plurality of multiprocessing nodes contains one or more processors and a local main memory;

main storage distributed among the multiprocessing nodes in a non-uniform memory access storage architecture such that the main storage includes the local main memories of the plurality of interconnected multiprocessing nodes, and wherein each local main memory is accessible by each processor among the plurality of interconnected multiprocessing nodes;

a pool reservation mechanism that dynamically reserves one or more pools of memory space within the main storage during operation of the multiprocessor system;

a pool allocation mechanism that allocates a reserved pool of memory space to one or more multiprocessing nodes among the plurality of interconnected multiprocessing nodes; and a process assignment mechanism that, following allocation of said reserved pool of memory space to said one or more multiprocessing nodes, assigns a process associated with said reserved pool of memory space to a multiprocessing node allocated that pool of memory space.

7. A multiprocessor system of non-uniform memory access storage architecture according to claim 6, wherein processes are given an attribute indicating the pool associated with the process.

8. A multiprocessor system of non-uniform memory access storage architecture according to claim 6, wherein a portion of memory is acquired by a process from the associated pool within the process' assigned node.

9. A multiprocessor system of non-uniform memory access storage architecture according to claim 6, wherein the pool reservation mechanism is software stored in the main storage and executed within the plurality of interconnected multiprocessing nodes.

10. A multiprocessor system of non-uniform memory access storage architecture according to claim 6, wherein the pool allocation mechanism is software stored in the main storage and executed within the plurality of interconnected multiprocessing nodes.

11. A multiprocessor system of non-uniform memory access storage architecture according to claim 6, wherein the process assignment mechanism is software stored in the main storage and executed within the plurality of interconnected multiprocessing nodes.

12. A multiprocessor system of non-uniform memory access storage architecture according to claim 6, further wherein the process assignment mechanism assigns each of a plurality of processes that accesses the pool to a multiprocessing node allocated that pool.

13. A multiprocessor system of non-uniform memory access storage architecture according to claim 6, further wherein the pool allocation mechanism allocates the pool of memory space to two or more multiprocessing nodes of the plurality of multiprocessing nodes such that the pool of memory space comprises memory space within the local main memories of the two or more multiprocessing nodes.

14. A multiprocessor system of non-uniform memory access storage architecture according to claim 13, wherein the process is assigned to a particular multiprocessing node among the two or more multiprocessing nodes as a function of utilization of said pool of memory space by each multiprocessing node.

15. A program product providing process assignment in a multiprocessor system having non-uniform memory access storage architecture, wherein the multiprocessor system has multiple interconnected multiprocessing nodes, each multiprocessing node containing one or more processors and a local main memory, and a main storage distributed among the local main memories, the program product comprising:

a pool reservation mechanism that dynamically reserves one or more pools of memory space within the main storage during operation of the multiprocessor system;

a pool allocation mechanism that allocates a reserved pool of memory space to one or more multiprocessing nodes among the plurality of interconnected multiprocessing nodes;

a process assignment mechanism that, following allocation of said reserved pool of memory space to said one or more multiprocessing nodes, assigns is a process associated with said reserved pool of memory space to a multiprocessing node allocated that pool of memory space; and signal bearing media bearing the pool reservation mechanism, the pool allocation mechanism, and the process assignment mechanism.

16. A program product providing process assignment in a multiprocessor system having non-uniform memory access storage architecture according to claim 15, wherein processes are given an attribute indicating the pool associated with the process.

17. A program product providing process assignment in a multiprocessor system having non-uniform memory access storage architecture according to claim 15, wherein a portion of memory is acquired for a process from the associated pool within the process' assigned node.

18. A program product providing process assignment in a multiprocessor system having non-uniform memory access storage architecture according to claim 15, further wherein the process assignment mechanism assigns each of a plurality of processes that accesses the pool to a multiprocessing node allocated that pool.

19. A program product providing process assignment in a multiprocessor system having non-uniform memory access storage architecture according to claim 15, wherein the signal bearing media comprises recordable media.

20. A program product providing process assignment in a multiprocessor system having non-uniform memory access storage architecture according to claim 15, wherein the signal bearing media comprises transmission media.

21. A program product providing process assignment in a multiprocessor system having non-uniform memory access storage architecture according to claim 15, further wherein the pool allocation mechanism allocates the pool of memory space to two or more multiprocessing nodes of the plurality of multiprocessing nodes such that the pool of memory space comprises memory space within the local main memory of the two or more multiprocessing nodes.

22. A program product providing process assignment in a multiprocessor system having non-uniform memory access storage architecture according to claim 21, wherein the process is assigned to a particular multiprocessing node among the two or more multiprocessing nodes as a function of utilization of said pool of memory by each multiprocessing node.

* * * * *

UNITED STATES PATENT AND TRADEMARK OFFICE
CERTIFICATE OF CORRECTION

PATENT NO. : 5,784,697

DATED : July 21, 1998

INVENTOR(S) : M R Funk, et al

It is certified that error appears in the above-identified patent and that said Letters Patent is hereby corrected as shown below:

On the title page, and column 1, line 2
 [54] Title, Line 2, "MYULTIPROCESSOR" should be --MULTIPROCESSOR--.

Col. 10, Line 1, delete "is".

Signed and Sealed this

Thirty-first Day of August, 1999

Attest:

Q. TODD DICKINSON

*Attesting Officer*     *Acting Commissioner of Patents and Trademarks*